US011058051B2

(12) United States Patent
van Kester

(10) Patent No.: US 11,058,051 B2
(45) Date of Patent: Jul. 13, 2021

(54) AGRICULTURAL MOWING MACHINE AND A METHOD FOR UNFOLDING/FOLDING THE MACHINE

(71) Applicant: Forage Company B.V., Maassluis (NL)

(72) Inventor: Robin A. A. van Kester, s-Gravenzande (NL)

(73) Assignee: FORAGE INNOVATIONS BV, Maassluis (NL)

( * ) Notice: Subject to any disclaimer, the term of this patent is extended or adjusted under 35 U.S.C. 154(b) by 378 days.

(21) Appl. No.: 16/310,194

(22) PCT Filed: Jun. 6, 2017

(86) PCT No.: PCT/NL2017/050363
§ 371 (c)(1),
(2) Date: Dec. 14, 2018

(87) PCT Pub. No.: WO2017/222367
PCT Pub. Date: Dec. 28, 2017

(65) Prior Publication Data
US 2019/0327880 A1    Oct. 31, 2019

(30) Foreign Application Priority Data
Jun. 24, 2016   (NL) .................................... 2017043

(51) Int. Cl.
*A01D 34/66*      (2006.01)
*A01B 63/10*      (2006.01)
(Continued)

(52) U.S. Cl.
CPC ........ *A01D 34/661* (2013.01); *A01B 63/1006* (2013.01); *A01B 73/044* (2013.01);
(Continued)

(58) Field of Classification Search
CPC .. A01B 73/044; A01B 63/006; A01D 34/006; A01D 34/662; A01D 34/06;
(Continued)

(56) References Cited

U.S. PATENT DOCUMENTS 4,873,818 A * 10/1989 Turner ................. A01D 34/866
                                                                56/10.8
6,349,529 B1 * 2/2002 Neuerburg ........... A01B 63/102
                                                                56/14.9
(Continued)

FOREIGN PATENT DOCUMENTS

DE   20 2005 008807 U1   10/2006
EP        2 644 015 A2   10/2013
(Continued)

OTHER PUBLICATIONS

European Patent Office, International Search Report for International Patent Application No. PCT/NL/2017/050363, dated Sep. 11, 2017.

*Primary Examiner* — Adam J Behrens

(57) ABSTRACT

An agricultural mowing machine comprises a carrying arm. A lateral displacement structure is connected to the carrying arm and can be displaced relative to the carrying arm in a lateral direction between an inner position and an outer position. A mowing unit is connected to the lateral displacement structure. The mowing unit can be moved between an approximately horizontal working position, a raised headland position, and a transport position. A first hydraulic cylinder and a second hydraulic cylinder are connected to each other in such a manner that hydraulic fluid discharged from said first or second hydraulic cylinder is supplied under pressure to the other of the first or second hydraulic cylinder for pivoting the carrying arm so as to move the mowing unit from the transport position towards the headland position (Continued)

displacing the lateral displacement structure outwards relative to the carrying arm simultaneously.

14 Claims, 13 Drawing Sheets

(51) Int. Cl.
*A01B 73/04* (2006.01)
*A01D 34/00* (2006.01)
A01D 34/64 (2006.01)
A01D 101/00 (2006.01)

(52) U.S. Cl.
CPC ......... *A01D 34/006* (2013.01); *A01D 34/662* (2013.01); *A01D 2034/645* (2013.01); *A01D 2101/00* (2013.01)

(58) Field of Classification Search
CPC .... A01D 34/246; A01D 34/661; A01D 34/64; A01D 34/664; A01D 34/665; A01D 34/866; A01D 2034/645; A01D 2101/00
See application file for complete search history.

(56) References Cited

U.S. PATENT DOCUMENTS

2015/0189831 A1* 7/2015 Wolff .................. A01D 34/866
56/255
2018/0295774 A1* 10/2018 Nielsen ................ A01D 34/866

FOREIGN PATENT DOCUMENTS

EP 3 005 853 A1 4/2016
NL 1 033 509 C2 9/2008

* cited by examiner

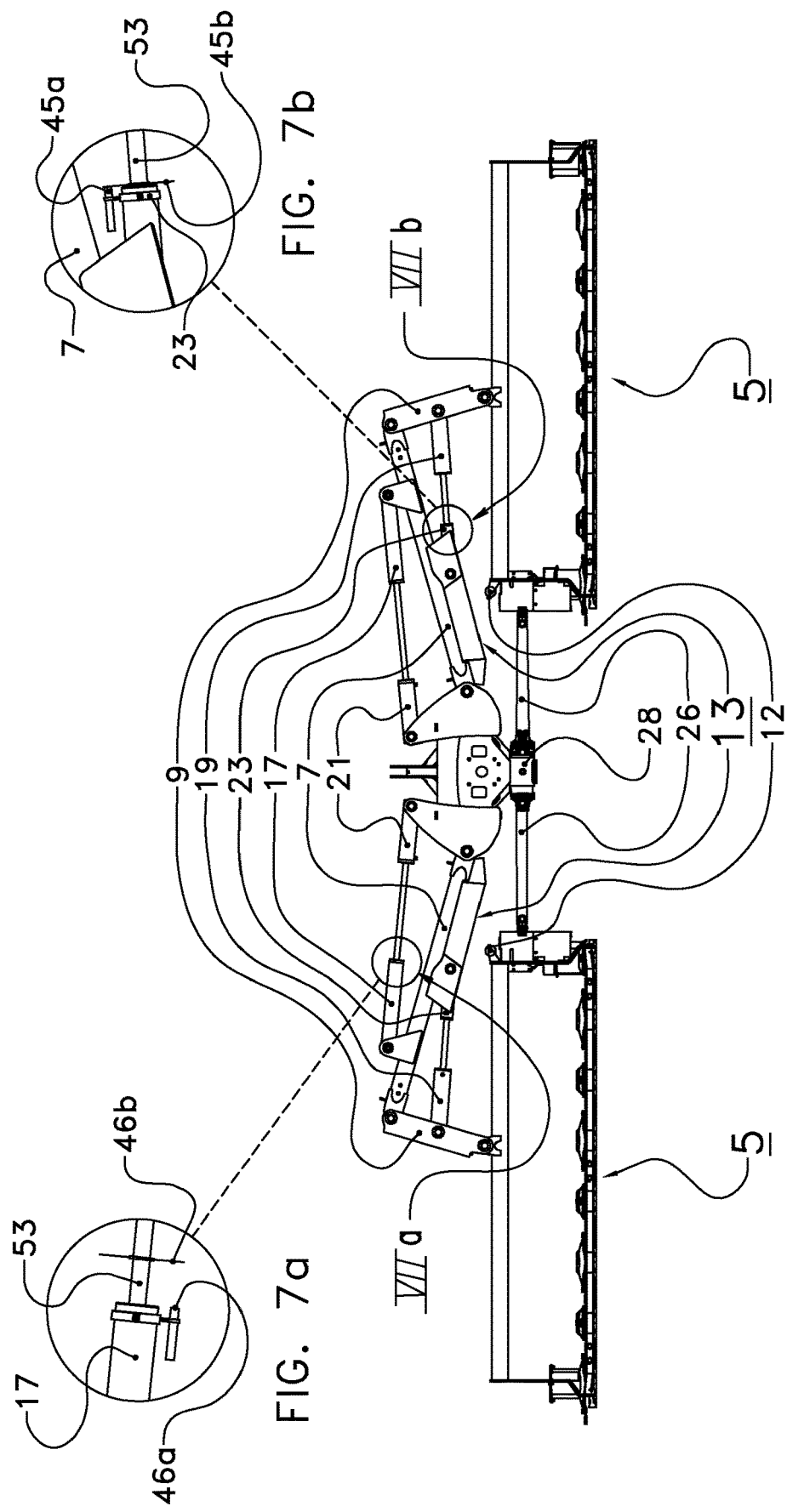

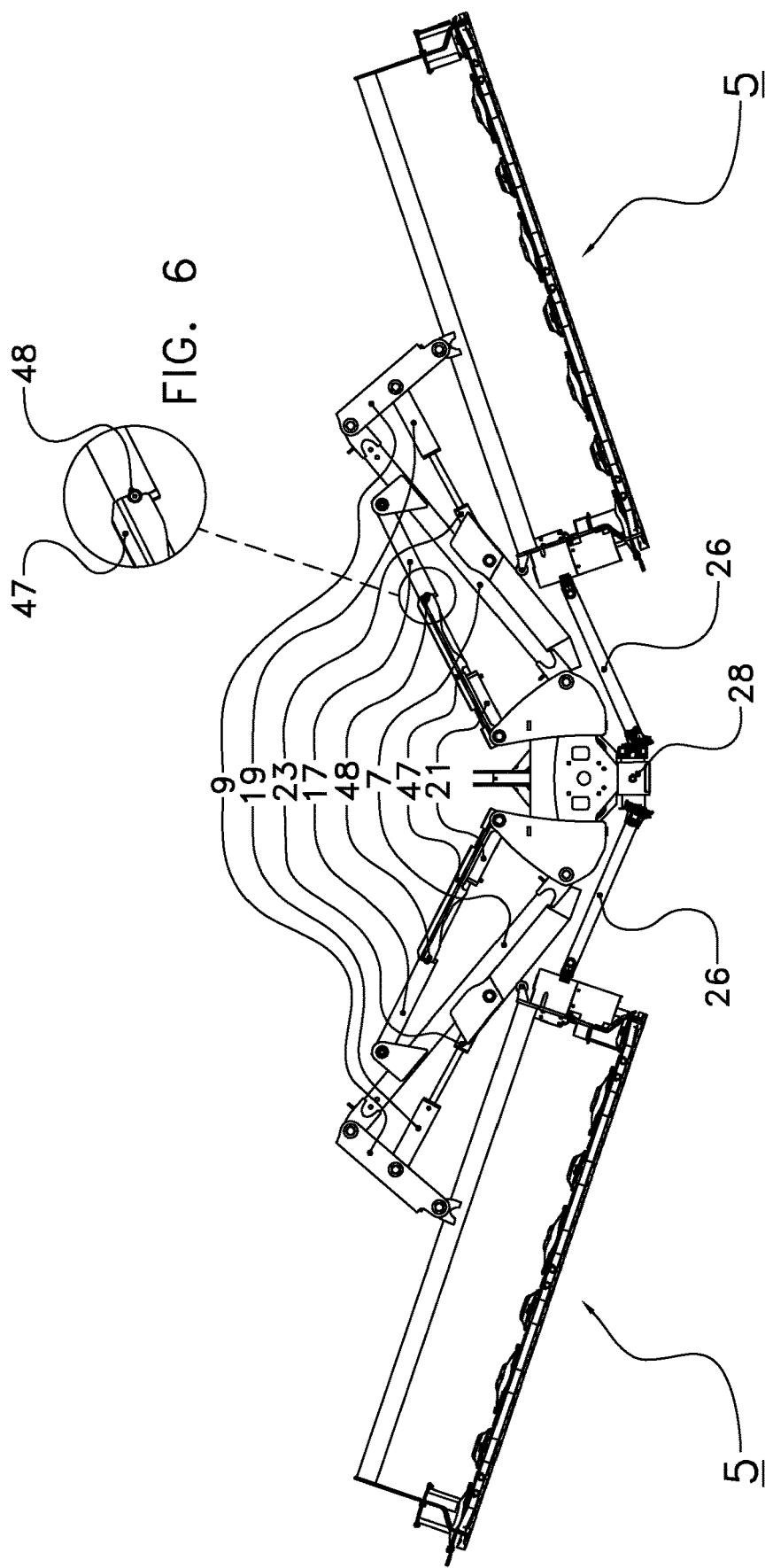

AGRICULTURAL MOWING MACHINE AND A METHOD FOR UNFOLDING/FOLDING THE MACHINE

The invention relates to an agricultural mowing machine, in particular for mowing grass.

Such an agricultural mowing machine is generally known. The machine comprises a frame having a coupling device for coupling the machine to a tractor, for example by means of a three-point linkage. The machine comprises a mowing unit having a plurality of cutting elements, for example mowing discs. The mowing unit can be moved between an approximately horizontal working position, a raised headland position, and a transport position. In the working position, the mowing unit extends transversely to a direction of travel and the cutting elements are rotating about an approximately vertical axis. In the transport position, the dimensions of the machine are reduced for transport over the public road. If the working width increases, it will be more difficult to design the machine in such a manner that the transport dimensions remain within acceptable limits.

It is an object of the invention to provide an improved agricultural mowing machine, in particular an agricultural mowing machine having a large working width in relation to its dimensions in the transport position, and wherein the mowing machine can be transferred from the transport position to the headland position and/or working position and vice versa in a simple and user-friendly manner.

This object is achieved according to the invention by an agricultural mowing machine, in particular for mowing grass, the machine comprising:
- a frame having a coupling device for coupling the machine to a tractor;
- a carrying arm which is pivotally connected to the frame;
- a first hydraulic cylinder being configured to pivot the carrying arm relative to the frame;
- a lateral displacement structure being connected to the carrying arm in such a manner that the lateral displacement structure can be displaced relative to the carrying arm in a lateral direction, in particular between an inner position and an outer position;
- a second hydraulic cylinder being configured to move the lateral displacement structure relative to the carrying arm;
- a mowing unit being connected to the lateral displacement structure, wherein in particular the mowing unit comprises a plurality of cutting elements, for example mowing discs, and wherein the mowing unit can be moved between an approximately horizontal working position, a raised headland position, and a transport position, wherein the first hydraulic cylinder and the second hydraulic cylinder are connected to each other in such a manner that, starting from the mowing unit in its transport position, when the first hydraulic cylinder or the second hydraulic cylinder is actuated by means of pressurized hydraulic fluid, hydraulic fluid discharged from said first or second hydraulic cylinder is supplied under pressure to the other of the first or second hydraulic cylinder for pivoting the carrying arm so as to move the mowing unit from the transport position towards the headland position and displacing the lateral displacement structure outwards relative to the carrying arm simultaneously.

In particular, the first hydraulic cylinder and the second hydraulic cylinder are connected to each other in such a manner that when the first hydraulic cylinder is actuated by means of pressurized hydraulic fluid for pivoting the carrying arm so as to move the mowing unit from the transport position towards the headland position, hydraulic fluid discharged from the first hydraulic cylinder is supplied under pressure to the second hydraulic cylinder for displacing the lateral displacement structure outwards relative to the carrying arm. However, it is also possible according to the invention that the first hydraulic cylinder and the second hydraulic cylinder are connected to each other in such a manner that when the second hydraulic cylinder is actuated by means of pressurized hydraulic fluid for displacing the lateral displacement structure outwards relative to the carrying arm, hydraulic fluid discharged from the first hydraulic cylinder is supplied under pressure to the first hydraulic cylinder for pivoting the carrying arm so as to move the mowing unit from the transport position towards the headland position.

In the transport position, the machine is configured to be transported over the public road, i.e. the dimensions of the machine in the transport position are reduced with respect to the working position, in particular to comply with regulations prescribing maximum transport dimensions. With the agricultural mowing machine according to the invention, in the transport position, the first and second hydraulic cylinders are fully retracted which ensures the lateral displacement structure is situated in its inner position. Thereby, the transport dimensions are reduced to a minimum.

When unfolding the machine, the first hydraulic cylinder is extended by pressurized hydraulic fluid thereby pivoting the carrying arm relative to the frame from the transport position towards the headland position and working position. As the hydraulic fluid discharged from the first hydraulic cylinder is supplied under pressure to the second hydraulic cylinder, at the same time, the second hydraulic cylinder is extended so as to move the lateral displacement structure from the inner position outwards relative to the carrying arm. The second hydraulic cylinder is configured to adjust the distance of the mowing unit relative to the frame, as seen in a lateral direction, in particular in a direction transverse to the direction of travel. As mentioned above, it is also possible according to the invention that, when unfolding the machine, the second hydraulic cylinder is extended by pressurized hydraulic fluid thereby moving the lateral displacement structure from the inner position outwards relative to the carrying arm, whereas the hydraulic fluid discharged from the second hydraulic cylinder is supplied under pressure to the first hydraulic cylinder so that, at the same time, the first hydraulic cylinder is extended for pivoting the carrying arm relative to the frame from the transport position towards the headland position and working position. In both cases, the operation of the first and second hydraulic cylinders is synchronized. Thus, the pivoting movement of the carrying arm and the movement of the lateral displacement structure with the mowing unit with respect to the carrying arm are carried out simultaneously. The lateral displacement structure with the mowing unit is moved with respect to the carrying arm substantially from the start of the pivoting movement of the carrying arm from the transport position.

Thus, according to the invention, the machine is unfolded from the transport position by means of not only a pivoting carrying arm, but also an additional lateral displacement structure for lateral displacement of the mowing unit relative to the carrying arm. With said lateral displacement in addition to the pivoting movement of the carrying arm, the working width can be increased while maintaining the maximum transport dimensions of the machine. Furthermore, as said two movements are synchronized by coupling the first and second hydraulic cylinders, in particular the first hydraulic cylinder and the second hydraulic cylinder are connected hydraulically in series, it is simple and user-friendly for the tractor driver to transfer the machine from the transport position to the headland position and/or working position and vice versa.

According to the invention, the machine may be unfolded from the transport position up to the headland position or into the working position. In the headland position, the carrying arm protrudes outwards relative to the frame and the mowing unit is situated above the ground to the extent that its cutting elements will not cut any grass. In the headland position, the mowing unit is raised from the ground so as to provide ground clearance, in particular for turning the machine at the headland of a field. If the first and second hydraulic cylinders are used for moving the mowing unit from the transport position up to the headland position only, the carrying arm can be lowered to the working position by actuating another hydraulic cylinder in order to move the mowing unit from the headland position to the working position. However, it is also possible according to the invention that the machine is transferred from the transport position into the working position by means of the first and second hydraulic cylinders. It is noted that the pivoting movement of the carrying arm for moving the mowing unit from the headland position to the working position does not have to be coupled to any lateral displacement of the lateral displacement structure with the mowing unit. In the working position, the mowing unit extends transversely to a direction of travel of the machine and the cutting elements are rotating about an approximately vertical axis.

Although according to the invention the carrying arm may be pivotally connected to the frame about a substantially vertical pivot axis in such a manner that the mowing unit in the transport position extends behind the tractor, in particular substantially in the direction of travel, it is preferred according to the invention that the carrying arm is pivotally connected to the frame about a substantially horizontal pivot axis, in particular a substantially horizontal pivot axis extending in the direction of travel. In this case, the first hydraulic cylinder may be pivotally connected between the frame and the carrying arm for moving the carrying arm between an approximately vertical position, wherein the mowing unit has its transport position, and a lowered position, wherein the mowing unit is in the headland position or the working position. Thus, by pivoting the carrying arm about the substantially horizontal pivot axis, the mowing unit can be moved between an approximately horizontal working position, a raised headland position, and an approximately vertical transport position. In the transport position, with the carrying arm extending substantially vertically, the mowing unit is also oriented in an upright position. When unfolding from the transport position, the mowing unit is not first lifted upwards by means of the second hydraulic cylinder and subsequently lowered by pivoting movement about the substantially horizontal pivot axis using the first hydraulic cylinder, but said first and second hydraulic cylinders work in unison so that the pivoting movement of the carrying arm and the outward lateral displacement of the mowing unit with respect to the carrying arm are carried out simultaneously. This results in a swift transition from the transport position to the headland position and/or working position. In addition, the centre of gravity of the machine remains relatively close to the ground during folding and unfolding, thereby increasing the stability of the machine according to the invention, especially on slopes. It is noted that according to the invention, when unfolding from the transport position, the mowing unit is not first lowered by pivoting movement of the carrying arm and thereafter moved outwards by means of the lateral displacement structure either. Such a sequence could lead to damage to a transmission shaft extending between the frame and the mowing unit, because in that case it may become shorter than its minimum length. When the design were adjusted to prevent such damage, the maximum working width of the agricultural mowing machine would be compromised. According to the invention, as a result of the synchronous movements, the transmission shaft can be prevented from becoming damaged while the maximum working width is optimized.

In a preferred embodiment according to the invention, the carrying arm can be pivoted about the substantially horizontal pivot axis in a vertical plane substantially transversely to the direction of travel between an approximately vertical position, wherein the mowing unit has its transport position, an upwardly inclined position, wherein the mowing unit has its headland position, and an approximately horizontal position, wherein the mowing unit has its working position, and wherein the mowing unit comprises a plurality a cutting elements which can be driven in rotation, and wherein the machine comprises a driveline arrangement which is configured to mechanically drive in rotation the cutting elements of the mowing unit, wherein the driveline arrangement comprises a transmission shaft with a variable length ranging from a minimum length up to a maximum length, and wherein the transmission shaft extends between the frame and the mowing unit and at least partially lies in said vertical plane of the carrying arm, and wherein the machine is configured in such a manner that when the carrying arm is pivoted from its approximately vertical position into its upwardly inclined position, in particular by means of the first hydraulic cylinder, the mowing unit is displaced simultaneously relative to the carrying arm, in particular by means of the second hydraulic cylinder, so as to prevent the transmission shaft from becoming shorter than its minimum length and/or longer than its maximum length and/or from running against the frame. The driveline arrangement can be mechanically coupled to a power take-off shaft of the tractor. Preferably, the mowing unit has a central suspension.

In this case, the transmission shaft for mechanically driving the cutting elements of the mowing unit extends in the same vertical plane as the carrying arm that can be pivoted for moving the mowing unit between the transport position, the headland position and the working position. The transmission shaft may be connected to a gearbox mounted on top of a cutting element of the mowing unit, i.e. said gearbox and the cutting elements are aligned with respect to each other. As a result of the first and second cylinders working in unison, even where the carrying arm and the transmission shaft run in the same vertical plane, the transmission shaft will not be damaged by becoming too short/long or hitting the frame, i.e. the carrying arm can be designed to run substantially in a straight line from the frame to the mowing unit, which has constructional advantages and also is desirable in terms of weight distribution. This is contrary to the prior art where the carrying arm may have a bend or a forked double arm design to accommodate the transmission shaft between the frame and the mowing unit.

In a further embodiment according to the invention, the machine comprises a control valve assembly which can be set in an unfolding position for actuating the first hydraulic cylinder or the second hydraulic cylinder by means of pressurized hydraulic fluid for pivoting the carrying arm so as to move the mowing unit from the transport position towards the headland position and, in unison with said pivoting movement, displacing the lateral displacement structure outwards relative to the carrying arm. In this case, it is preferred that, with the mowing unit in the headland position, the control valve assembly can be set in a folding position for actuating the second hydraulic cylinder or the first hydraulic cylinder by means of pressurized hydraulic fluid for displacing the lateral displacement structure inwards relative to the carrying arm, preferably into the inner position, and, in unison with said inward movement, pivoting the carrying arm from the headland position towards the transport position. Thereby, the unfolding and folding process of the machine can be carried out in a swift and simple manner.

According to a preferred embodiment of the invention, the first and second hydraulic cylinders each comprise:
- a cylinder bottom and a cylinder head,
- a piston/piston rod assembly comprising a piston rod which protrudes outwards through an associated bore in the cylinder head and a piston which is attached to the piston rod, wherein the piston delimits in the cylinder between the piston and the cylinder head a variable head-side chamber, and further delimits between the piston and the cylinder bottom a variable bottom-side chamber; and
- wherein the head-side chamber of the first hydraulic cylinder is hydraulically connected to the bottom-side chamber of the second hydraulic cylinder such that pressurizing the bottom-side chamber of the first hydraulic cylinder or pressurizing the head-side chamber of the second hydraulic cylinder in order to move the respective piston of the first or second hydraulic cylinder, will automatically result in movement of the piston of the other of the first or second hydraulic cylinder. As a result thereof, a relatively large working width can be achieved while the transport dimensions remain small, in particular comply with regulations therefor.

In a preferred embodiment according to the invention, a third hydraulic cylinder is provided which is configured to lift the mowing unit from the working position towards the headland position, wherein the first hydraulic cylinder and the third hydraulic cylinder have a common piston rod thereby constituting a first double cylinder arrangement. The first double cylinder arrangement may be pivotally connected between the frame and the carrying arm. The headland position of the mowing unit may be defined by the third hydraulic cylinder in its fully retracted state. In this case, when lifting the mowing unit from the working position into the headland position by actuating the third hydraulic cylinder, the headland position is reached as soon as the third hydraulic cylinder is fully retracted. However, the headland position may also be defined by means of a stop. For example, the first double cylinder arrangement comprises a protruding pin which is received in a bracket forming a stop when the mowing unit is lifted to headland. In order to lift the mowing unit to the transport position, the bracket may be swung away, for example by pulling a cord from the driver's cab or hydraulically. In both cases, it is possible for the tractor driver to bring the mowing unit to the headland position by means of a single operation only, i.e. actuating the third hydraulic cylinder. Thus, when turning at the headland of a field, the tractor driver can concentrate on steering.

It is possible according to the invention that the third hydraulic cylinder is connected to a hydraulic accumulator for providing ground pressure relief for the mowing unit in the working position. In this case, the third hydraulic cylinder is not only used for lifting the mowing unit to the headland position, but also for setting the ground pressure exerted by the mowing unit on the ground during working. Such a double function for the third hydraulic cylinder results in an effective use of components. Preferably, the pressure in the hydraulic accumulator can be set in order to adjust the ground pressure relief. Thus, the ground pressure relief can be controlled in an accurate manner.

In an embodiment of the invention, a fourth hydraulic cylinder is provided which is configured to adjust the working position of the mowing unit transversely to a direction of travel between a narrowest working position and a widest working position, wherein the second hydraulic cylinder and the fourth hydraulic cylinder have a common piston rod thereby constituting a second double cylinder arrangement. The second double cylinder arrangement may be connected, preferably pivotally connected, between the carrying arm and the lateral displacement structure. With the second and fourth hydraulic cylinders fully extended, the lateral displacement structure has its outer position, which defines the widest working position of the mowing unit. When the mowing unit is situated in its narrowest working position, the fourth hydraulic cylinder is fully retracted, whereas the second hydraulic cylinder is still fully extended. Then, the lateral displacement structure has not yet reached its inner position. Only when the second hydraulic cylinder is actuated so as to be fully retracted as well, the lateral displacement structure will obtain its inner position. As the second hydraulic cylinder is hydraulically coupled to the first hydraulic cylinder, the carrying arm is operated for moving the mowing unit to the transport position at the same time, i.e. the lateral displacement structure reaches its inner position when the mowing unit has its transport position. The fourth hydraulic cylinder can be operated independently from the driver's cab. The fourth hydraulic cylinder provides a hydraulic sideshift of the mowing unit.

In an embodiment according to the invention, a first sensor is provided which is configured to detect if the fourth hydraulic cylinder is fully retracted so that the mowing unit is in its narrowest working position, wherein a second sensor is provided which is configured to detect if the third hydraulic cylinder is fully retracted when or after the mowing unit has reached the headland position when lifting from the working position, and wherein a control device is provided which is connected to the first and second sensors for receiving detection signals therefrom, and wherein the control device is configured or programmed to allow the first hydraulic cylinder and/or the second hydraulic cylinder to be actuated by means of pressurized hydraulic fluid so as to move the mowing unit to the transport position only if the first and second sensors have detected that the third and fourth hydraulic cylinders have been fully retracted. For example, the control device comprises an electronic control device which is combined with the control valve arrangement described above. The first and second sensors may, for example, be provided with proximity sensors and detection plates mounted on the cylinders and piston rod.

In this case, when folding the machine from the working position to the transport position, first the fourth hydraulic cylinder must be fully retracted so as to move the mowing unit to its narrowest working position and the third hydraulic cylinder must be fully retracted so as to lift the mowing unit up to or beyond the headland position. Only after the fourth and third hydraulic cylinders have been fully retracted, i.e. only after the mowing unit has been adjusted to its narrowest working position and the mowing unit has been lifted up to or beyond the headland position, the control device will allow the first and/or second hydraulic cylinders to be pressurized by hydraulic fluid for raising the mowing unit into the transport position. If the fourth or third hydraulic cylinder has not been fully retracted yet, i.e. if the mowing unit is not in its narrowest working position or has not reached the headland position yet, the control device prevents the first and second hydraulic cylinders from being actuated by pressurized hydraulic fluid. Thus, the folding process from the working position to the transport position is controlled with the aid of the control device and the first and second sensors. The control device and associated sensors impose a predetermined sequential order for the folding process, thereby ensuring that the corresponding movements, in particular of the carrying arm, the mowing unit and the transmission shaft, can be performed without components blocking the way or causing damage.

The lateral displacement structure can be constructed in various ways. Preferably, the lateral displacement structure comprises a swivel arm which is pivotally connected between the carrying arm and the mowing unit. The upper end of the swivel arm is hinged to the carrying arm about an upper hinge axis extending substantially horizontally in the direction of travel. The lower end of the swivel arm is hinged to the mowing unit about a lower hinge axis running substantially horizontally in the direction of travel. The swivel arm allows the mowing unit to be displaced in the lateral direction, i.e. closer to or away from the frame, in a reliable manner, in particular with only little play, which is important for agricultural mowing machines. However, the lateral displacement structure may also be designed as a telescopic arm, i.e. the lateral displacement structure consists of a sliding arm which is connected in a telescopic manner to the carrying arm. Alternatively, the lateral displacement structure may comprise a trolley which can be displaced in a guided manner along the carrying arm.

In an embodiment according to the invention, the mowing unit at an upper inner portion thereof comprises an abutting element facing the carrying arm, wherein the carrying arm at a lower portion thereof comprises a guide track which is configured to guide the abutting element of the mowing unit when the mowing unit is moved from the transport position towards the headland position. The abutting element can be constructed in various ways. For example, the abutting element is constituted by a roller. The abutting element abuts against the guide track of the carrying arm when the machine is unfolded thereby controlling the tilting movement of the mowing unit about the lower hinge axis of the swivel arm so that the other parts of the mowing unit are kept at a safe distance from the carrying arm and the transmission shaft does not become too short and/or does not run against the carrying arm. However, such control of the tilting movement of the mowing unit during unfolding may be accomplished in a different manner. It is noted that, in addition, the abutting element and the guide track constitute a stop for tilting movement of the mowing unit when following the ground during work.

In an embodiment according to the invention, the mowing unit constitutes a side mowing unit which is configured to be mounted to the rear of a tractor for extending to the side of the tractor in the working position, and wherein the machine comprises a frontal mowing unit configured to be mounted in front of the tractor, and wherein the positioning of the mowing units is such that the working area of the side mowing unit overlaps the area already worked by the frontal mowing unit, and wherein said overlap can be adjusted during work by actuating the fourth hydraulic cylinder for moving the side mowing unit transversely with respect to the direction of travel. The cutting overlap is defined by the distance by which the working areas of the front and side mowing units overlap, as seen transversely to the direction of travel. By way of indication, the cutting overlap is in the order of 5-80 cm, for example 15-60 cm. When mowing on a slope, the cutting overlap can be adjusted from the driver's cab, which is user-friendly.

The invention also relates to a method for unfolding/folding a machine as described above from the transport position, comprising actuating the first hydraulic cylinder or the second hydraulic cylinder by means of pressurized hydraulic fluid for pivoting the carrying arm so as to move the mowing unit between the transport position and the headland position and, in unison therewith, displacing the lateral displacement structure relative to the carrying arm. As hydraulic fluid discharged from the first or second hydraulic cylinder is supplied under pressure to the other of the first or second hydraulic cylinder, the pivoting movement of the carrying arm and the lateral displacement of the lateral displacement structure with the mowing unit relative to the carrying arm are carried out simultaneously.

The invention will now be explained in more detail with reference to the accompanying drawing.

FIGS. 3a-3f show front views of the machine illustrated in FIG. 1 being unfolded from the transport position to the widest working position.

Figure 1:
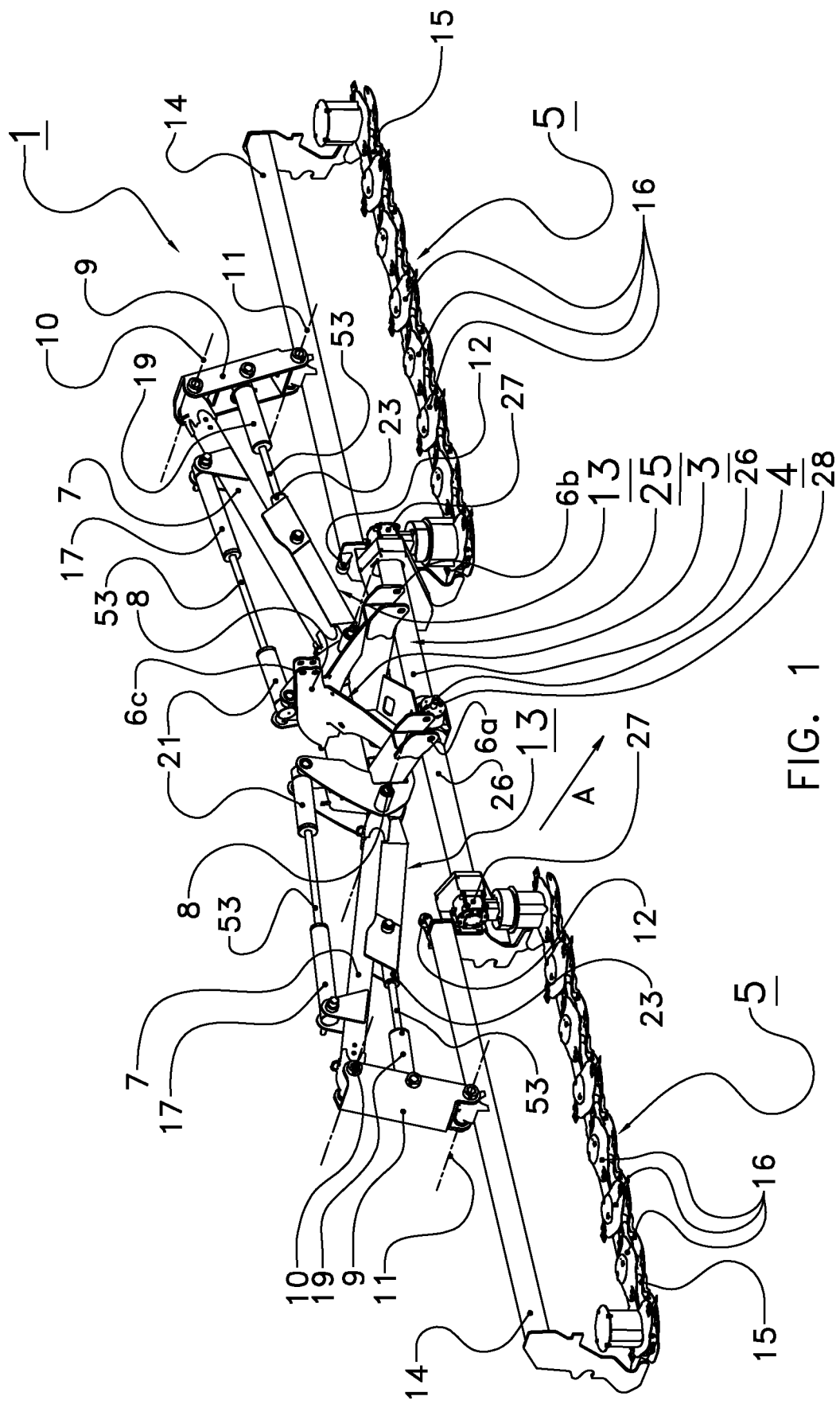
FIG. 1 shows a perspective view of a first embodiment of an agricultural mowing machine according to the invention in the working position.
Figure 2:
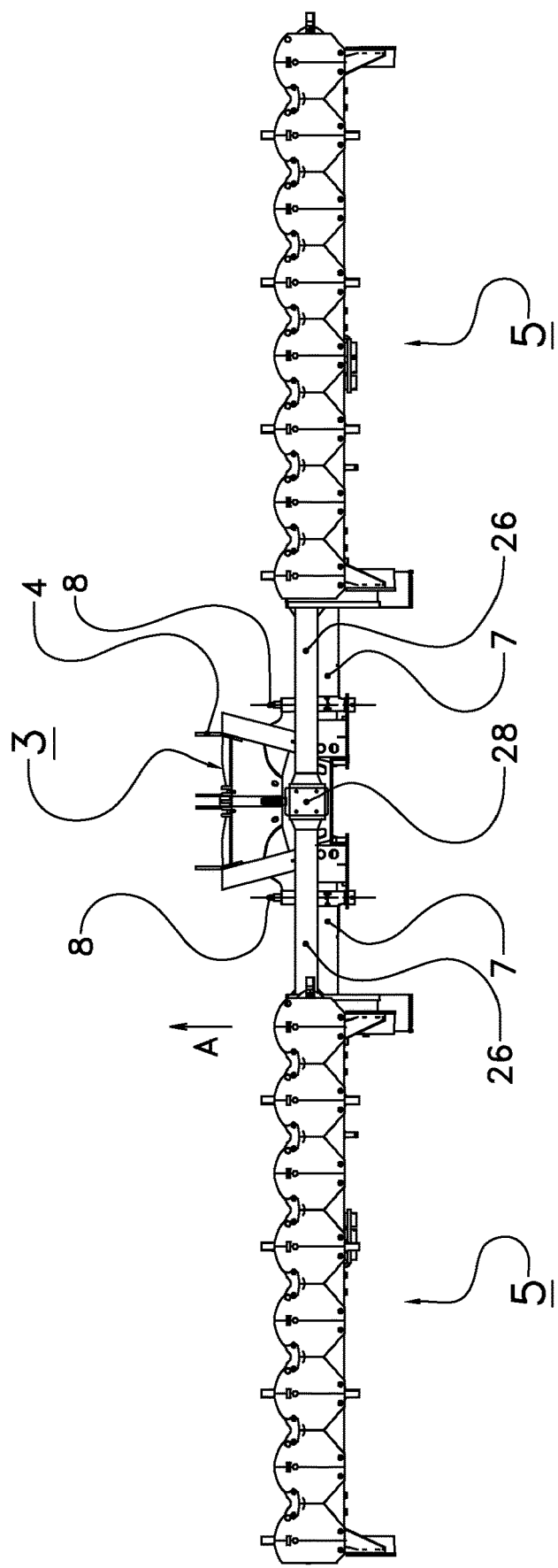
FIG. 2 shows a bottom view of the machine illustrated in FIG. 1.
Figure 4:
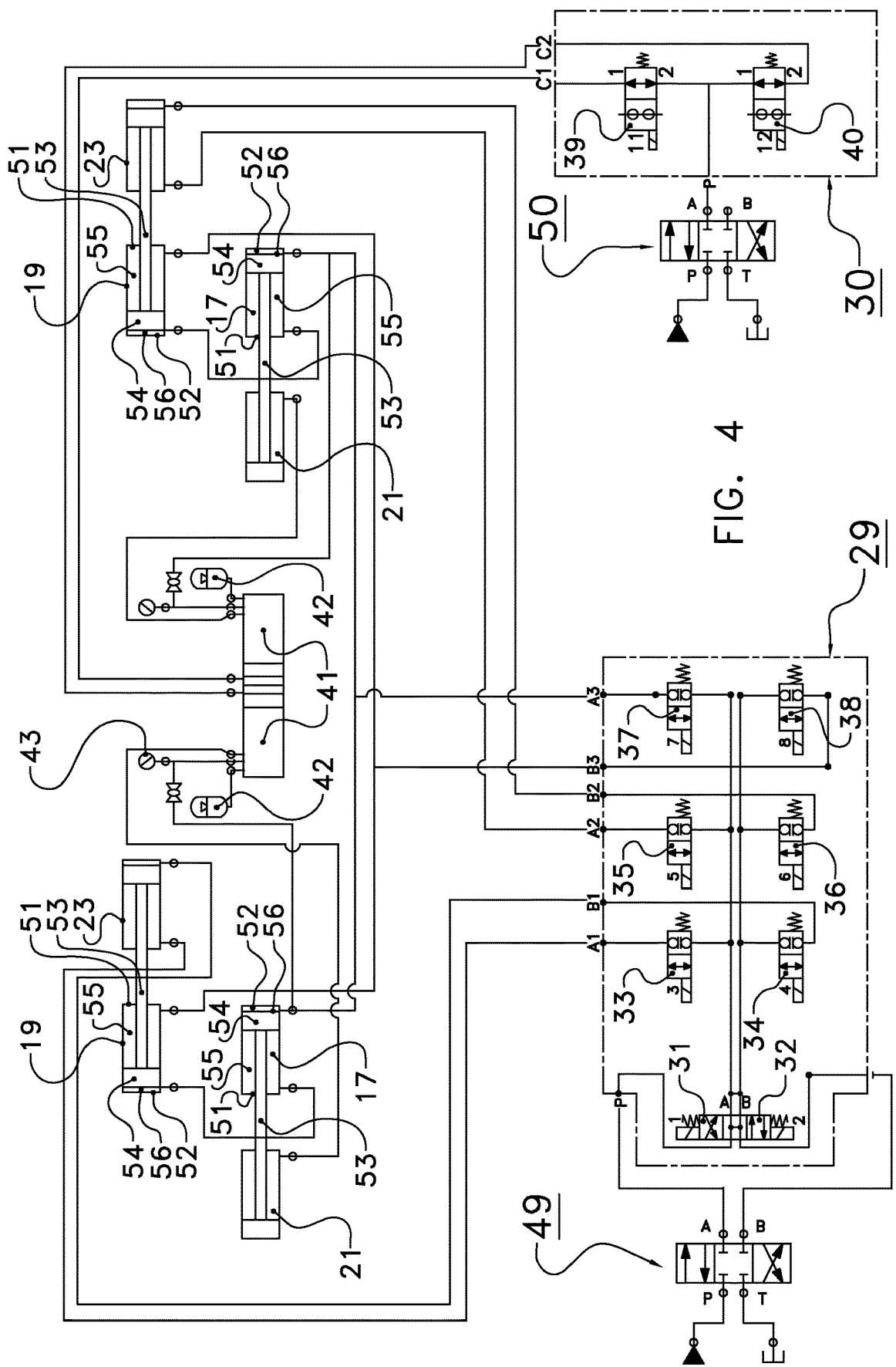
Figure 5A:
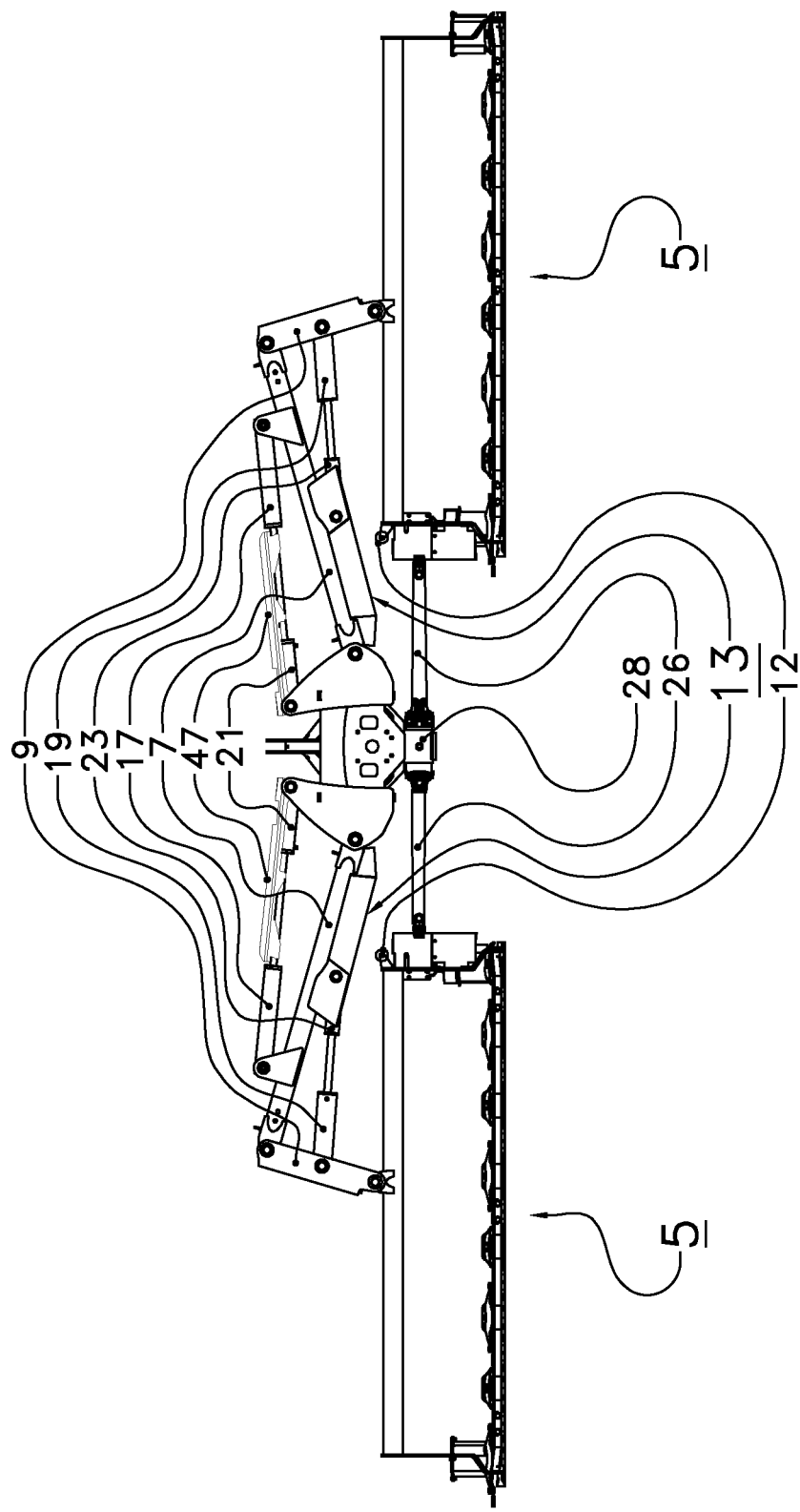
Figure 5C:
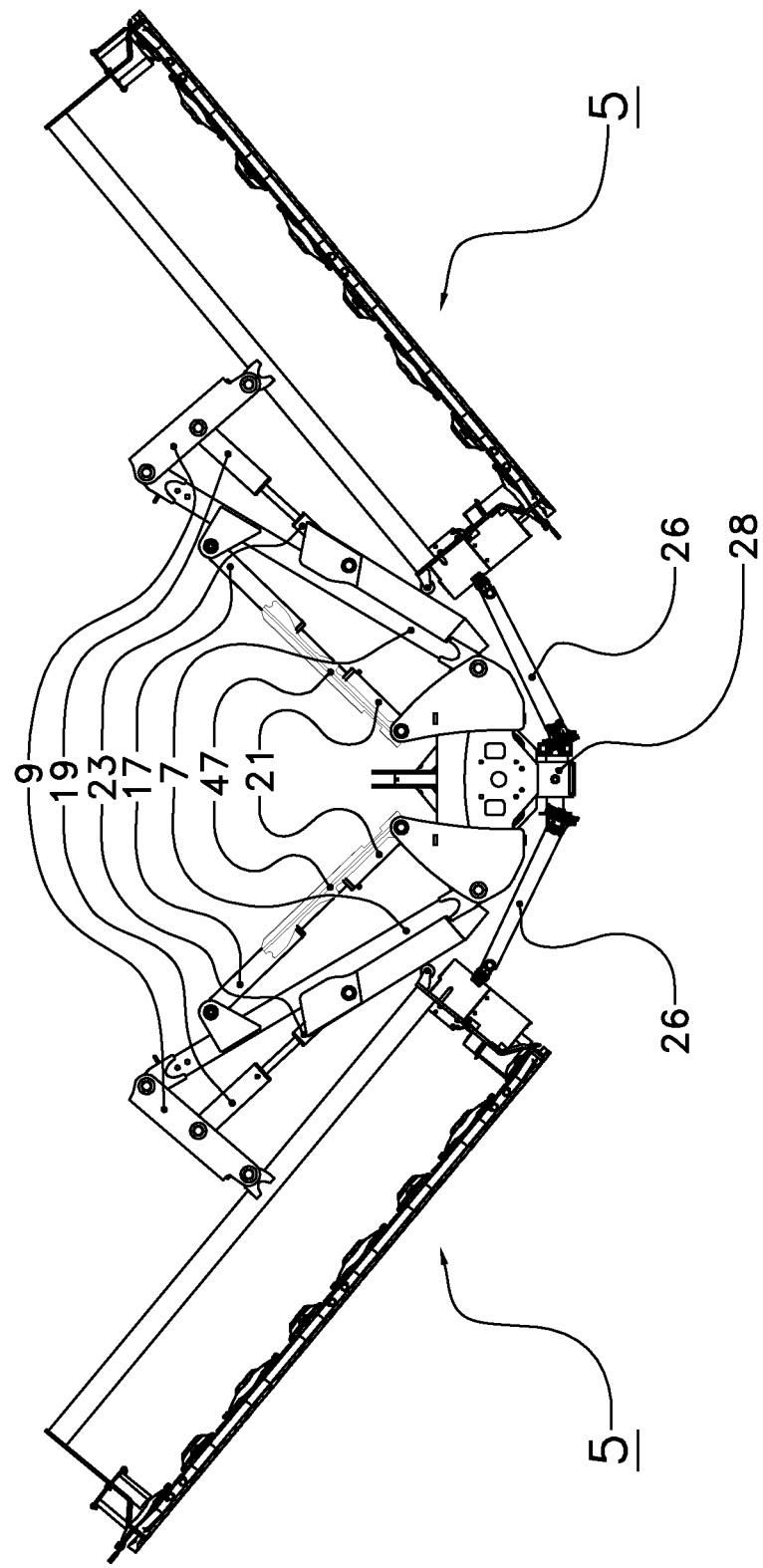
Figure 5D:
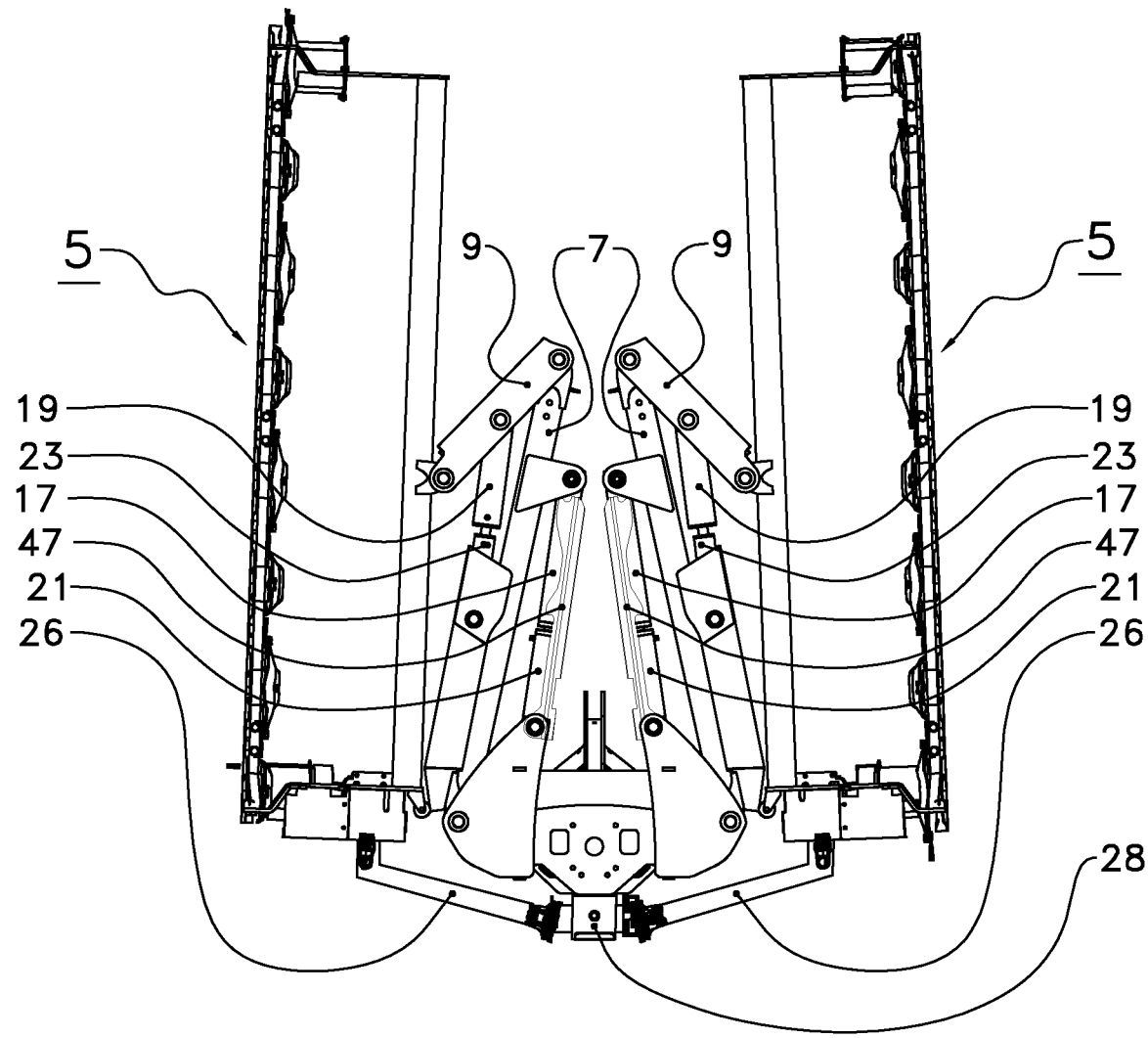

FIG. 4 schematically shows the hydraulic system of the machine illustrated in FIG. 1.

FIGS. 5a-5d show front views of a second embodiment of the machine according to the invention being folded from the narrowest working position up to the transport position.

FIG. 6 shows a detail of FIG. 5b.

Figure 3A:
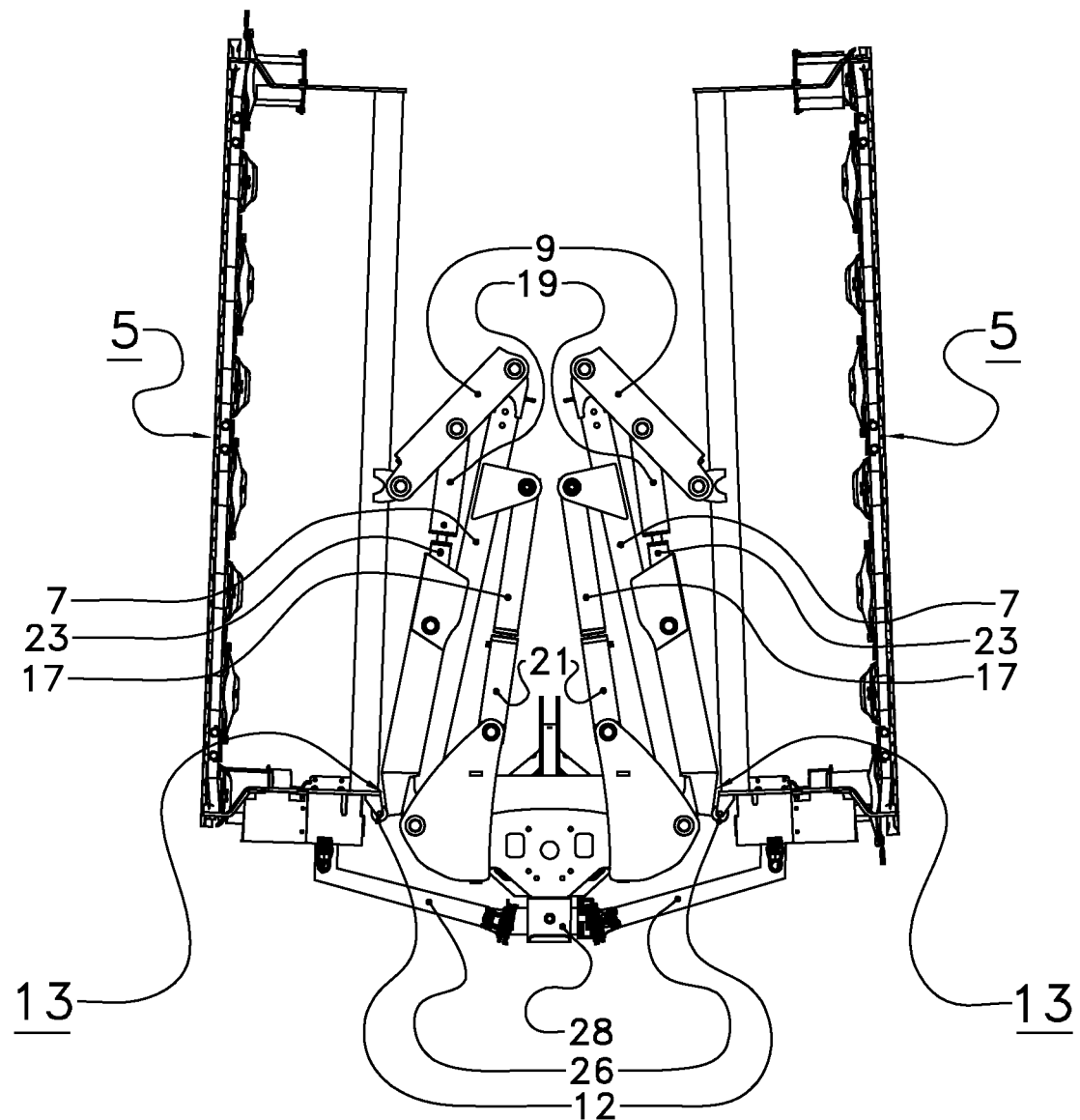
Figure 3B:
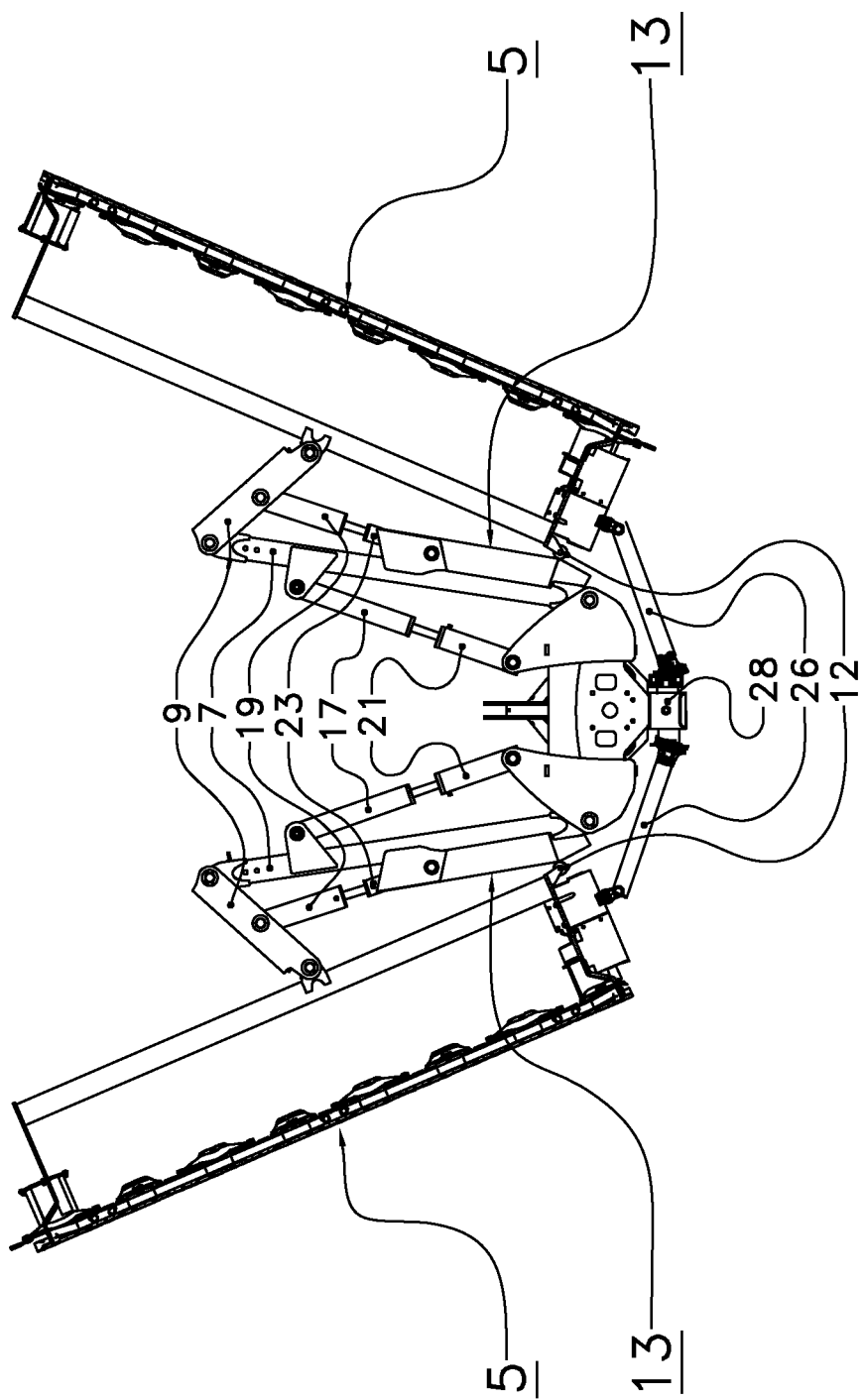
Figure 3C:
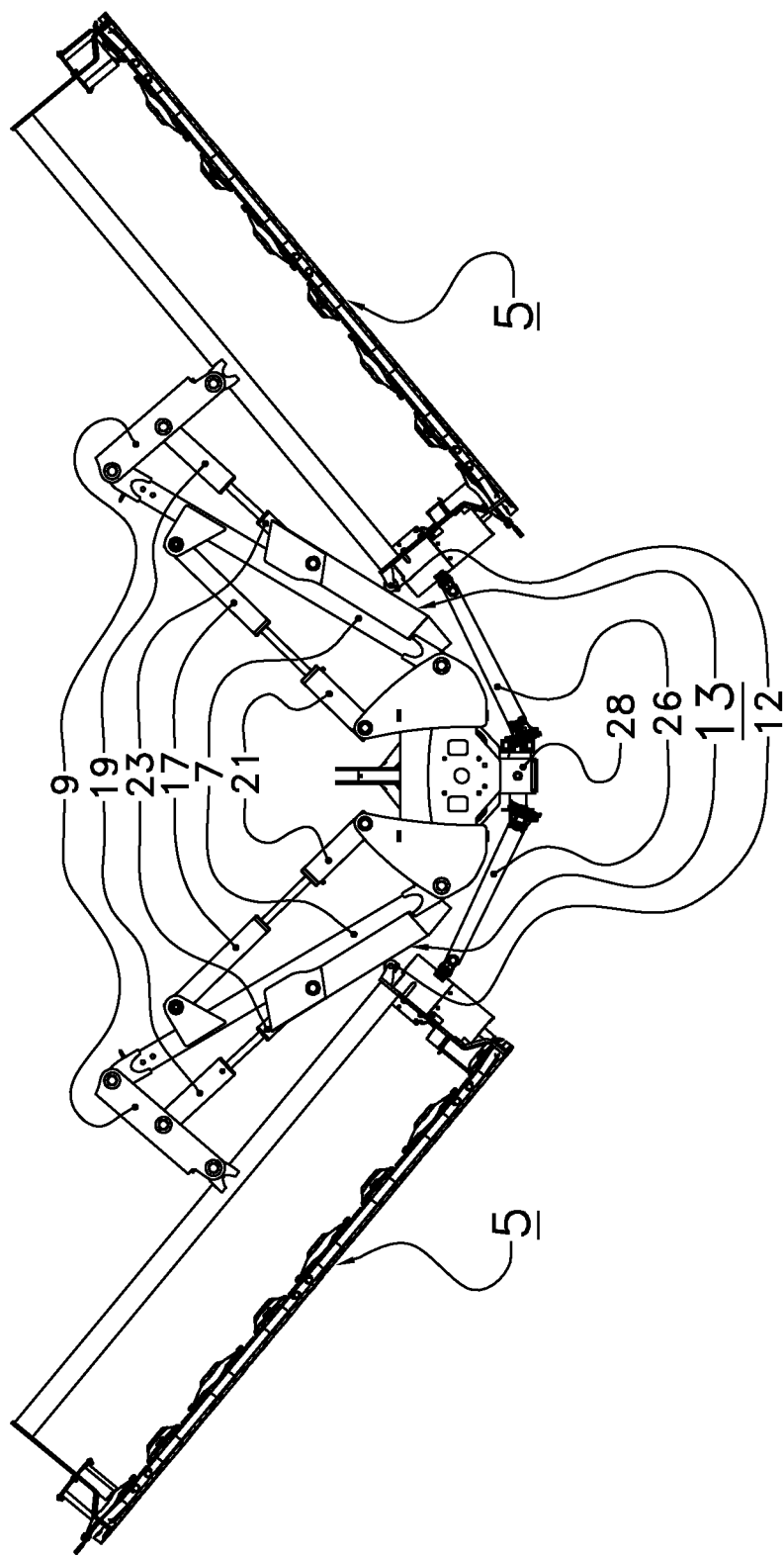

FIGS. 7a, 7b show details of FIG. 3e.

Referring now to the drawings, wherein like reference numerals designate identical or corresponding parts throughout the several views, the agricultural mowing machine 1 as shown in FIG. 1 comprises a frame 3 and two side mowing units 5 which are configured to be mounted to the rear of a tractor (not shown). With the exemplary embodiment shown in FIG. 1, the frame 3 comprises a coupling device 4 for coupling the machine 1 to a three-point linkage of the tractor. The coupling device 4 comprises coupling members 6a, 6b for hitching the machine 1 to the lower lifting arms of the three-point linkage, and also a coupling member 6c for connecting the machine 1 to the top link of the three-point linkage. It should be noted that the coupling device may be constructed in various alternative ways.

Although not illustrated in the figures, the agricultural mowing machine 1 according to this exemplary embodiment includes a frontal mowing unit configured to be mounted in front of the tractor. The frontal mowing unit together with the butterfly mowing machine shown in FIG. 1 constitute a triple mower. During work, the positioning of the side mowing units 5 with respect to the frontal mowing unit is such that the working area of the side mowing units 5 overlaps the area already worked by the frontal mowing unit. The overlapping distance, as seen transversely to the direction of travel A, is referred to as the cutting overlap. By way of indication, the cutting overlap is in the order of 10-90 cm, for example between 15-60 cm. It should be noted that the agricultural mowing machine according to the invention may also comprise only one or two side mowing units mounted at the rear of a tractor, without any frontal mowing unit.

The side mowing units 5 are substantially identical, i.e. they are constructed in the same manner except that one side mowing unit 5 extends on the left and the other side mowing unit 5 is situated on the right. The side mowing units 5 each comprise a mower bar frame 14, a mower bar 15 and a plurality of cutting elements 16, which may also be referred to as mowing discs 16. Although not shown in the figures, each side mowing unit 5 may also comprise a conditioner behind the mower bar 15, as seen in the direction of travel A. In addition, the mowing units 5 may be provided with a swath conveyor belt (not shown). It should be noted that instead of a disc mower, the cutting mechanism could be of any type. Mowing units as such are widely used.

The cutting elements 16 of the mowing units 5 can be driven in rotation by means of a driveline arrangement 25. The driveline arrangement 25 is configured to mechanically drive in rotation the cutting elements 16 of the mowing units 5. In this exemplary embodiment, the driveline arrangement 25 comprises a central transmission shaft which is adapted to be mechanically coupled to a power take-off shaft of the tractor (not shown). The central transmission shaft is connected to a central gearbox 28.

Transmission shafts 26 extend from the central gearbox 28, on the left and right side thereof, respectively, to the mowing units 5. The transmission shafts 26 are connected to a gearbox 27 which is mounted on top of the innermost cutting element 16 of the respective mowing units 5. The transmission shafts 26 are formed by telescopic shafts, for example comprising two or three shaft portions which can slide with respect to each other in a telescoping manner. Transmission shafts of this type are widely known as such, and they have a variable length, which ranges from a predetermined minimum length to a predetermined maximum length.

Figure 3D:
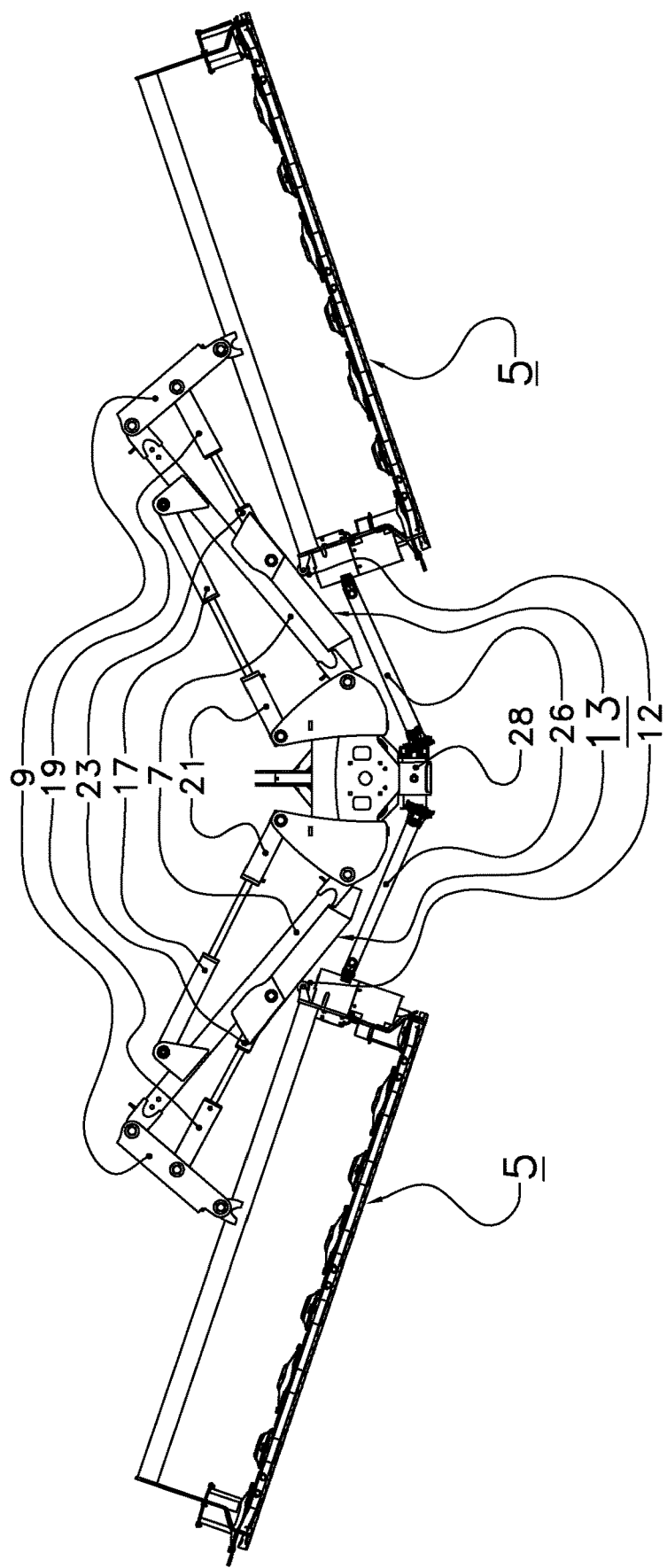

The mowing units 5 can be moved hydraulically between an approximately horizontal working position, a raised headland position, and a transport position. In the working position (FIGS. 1, 2, 3e, 3f), the mowing units 5 extend substantially transversely to the direction of travel A and the cutting elements 16 are rotating about an approximately vertical axis for cutting grass or other agricultural crop. In the headland position (FIG. 3d), the mowing units 5 have been raised from the ground, in particular for turning the machine at the headland of a field. In the transport position (FIG. 3a), the mowing units 5 are oriented substantially vertically so as to reduce the dimensions of the agricultural mowing machine 1 for transport over the public road. In particular, the transport dimensions are up to 3 meters wide and 4 meters high, which complies regulations in most countries.

For moving each mowing unit 5 between its working position, headland position and transport position, it is connected to the frame 3 by means of a carrying arm 7 and a lateral displacement structure in the form of a swivel arm 9 in this exemplary embodiment. The carrying arm 7 can be pivoted about a substantially horizontal pivot axis 8 extending in the direction of travel A. Thereby, the carrying arm 7 can be pivoted in a vertical plane substantially transversely to the direction of travel A and positioned in an approximately vertical position corresponding to the transport position of the mowing unit 5 (FIG. 3a), an upwardly inclined position, with the mowing unit 5 in its headland position (FIG. 3d) and an approximately horizontal position, wherein the mowing unit 5 is situated in its working position (FIGS. 1, 2, 3e, 3f). As can be seen clearly in FIG. 2, the carrying arms 7 and the transmission shafts 26 of the driveline arrangement 25 at least partially extend in the same vertical plane.

The upper end of the swivel arm 9 is hinged to the carrying arm 7 about an upper hinge axis 10 extending substantially horizontally in the direction of travel A. The lower end of the swivel arm 9 is hinged to the mowing unit 5 about a lower hinge axis 11 also running substantially horizontally in the direction of travel A. The mowing unit 5 is suspended centrally from the lower hinge axis 11 of the swivel arm 9. The swivel arm 9 allows the mowing unit 5 to be displaced in the lateral direction, i.e. closer to or away from the frame 3. It should be noted that the lateral displacement structure may also be designed in a different manner, for example the swivel arm 9 may be replaced by a trolley or other sliding member which can be moved in a sliding manner along the carrying arm, or the carrying arm and swivel arm may be replaced by a telescopic arm.

The carrying arms 7 and swivel arms 9 can be controlled by means of a hydraulic system for moving the mowing units 5 between their respective positions. For each mowing unit 5, a first double cylinder arrangement 17, 21 is pivotally connected between the frame 3 and the associated carrying arm 7, whereas a second double hydraulic cylinder arrangement 19, 23 is pivotally connected between said carrying arm 7 and the swivel arm 9 carrying said mowing unit 5. The first and second double cylinder arrangements 17, 21 and 19, 23 can be controlled from the driver's cab according to the hydraulic scheme shown in FIG. 4.

The hydraulic system comprises a first control valve assembly 29 which can be hydraulically connected to a double-acting tractor valve 49. The first control valve assembly 29 comprises a number of control valves 31, 32, 33, 34, 35, 36, 37, 38, which are connected to the double-acting tractor valve 49 and ports A1, B1, A2, B2, A3, B3. The hydraulic system also comprises a control panel (not shown) for controlling the control valves 31 to 38 of the first control valve assembly 29 from the driver's cab of the tractor, for example by pushing buttons on the control panel.

As illustrated in FIG. 4, the first double cylinder arrangement 17, 21 comprises a first hydraulic cylinder 17 having a cylinder head 51, a cylinder bottom 52, and a piston/piston rod assembly, which consists of a piston rod 53 which protrudes outwards through an associated bore in the cylinder head 51, and a piston 54 which is attached to the piston rod 53. The piston 54 is accommodated in the first hydraulic cylinder 17 such that it can be reciprocated therein. The reciprocating piston 54 delimits in the first hydraulic cylinder 17 between the piston 54 and the cylinder head 51 a variable head-side chamber 55, and further delimits between the piston 54 and the cylinder bottom 52 a variable bottom-side chamber 56. The second double cylinder arrangement 19, 23 comprises a second hydraulic cylinder 19, which includes the same components.

As shown in FIG. 4, the head-side chamber 55 of the first hydraulic cylinder 17 is hydraulically connected in series to the bottom-side chamber 56 of the second hydraulic cylinder 19. Thereby, starting from the transport position shown in FIG. 3a, by controlling the control valves 32, 37 and 38, pressurized hydraulic fluid can be directed from the double-acting tractor valve 49 through the port A3 into the bottom-side chamber 56 of the first hydraulic cylinders 17 for moving the pistons 54 accommodated therein (to the left in FIG. 4). As a result, the carrying arms 7 are lowered from their approximately vertical orientation by pivoting movement about the horizontal pivot axes 8 until the mowing units 5 reach their headland positions (see FIGS. 3a to 3d).

As the first hydraulic cylinder 17 and the second hydraulic cylinder 19 are connected to each other, hydraulic fluid discharged from the head-size chamber 55 of the first hydraulic cylinder 17 is supplied under pressure to the bottom-side chamber 56 of the second hydraulic cylinder 19, thus actuating the pistons 54 accommodated therein (to the right in FIG. 4). As a result, the swivel arms 9 are swung outwards about their upper hinge axes 10 relative to the carrying arms 7 in unison with the unfolding pivoting movement of the carrying arms 7. The first and second hydraulic cylinders 17, 19 are connected hydraulically in series ("master/slave") so that while the carrying arms 17 are lowered from the transport position, the swivel arms 9 push the mowing units 5 outwards with respect to the carrying arms 17 simultaneously. In this exemplary embodiment, in the headland position of the mowing units 5, the first and second hydraulic cylinders 17, 19 are fully extended.

As illustrated in FIGS. 3a to 3d, the carrying arms 7 each include a guide track 13 at a lower portion thereof. In addition, the mowing units 5 each comprise an abutting element in the form of a roller 12. The roller 12 is arranged at the upper inner end portions of the mowing units 5. In the transport position shown in FIG. 3a, the rollers 12 abut against the guide tracks 13, i.e. the guide tracks 13 constitute a stop for the rollers 12 of the mowing units 5. During the unfolding movement of the carrying arms 7, the rollers 12 run along the guide tracks 13 to guide the tilting movement of the mowing units 5 along the lower hinge axes 11. As a result of the simultaneous movement of the carrying arms 7 and the swivel arms 9 by means of the first and second hydraulic cylinders 17, 19, together with the tilting movement of the mowing units 5 about the lower hinge axes 11 guided by the rollers 12 abutting against the guide tracks 13, the transmission shafts 26 are prevented from becoming too short/long and/or hitting the frame 3 while they are situated in the same vertical plane as the carrying arms 7. This is very advantageous in terms of costs, weight distribution and constructional loads.

After the mowing units 5 have reached their headland positions, by setting the tractor valve 49 into a floating state, the mowing units 5 are lowered to the working position shown in FIG. 3e under the influence of gravity, thereby extending the third hydraulic cylinders 21 of the first double cylinder arrangements. The first and third hydraulic cylinders 21 of each first double cylinder arrangement have a common piston rod 53. The working position shown in FIG. 3e represent the narrowest working position of the agricultural mowing machine 1.

The working width of the left and right mowing units 5 can be adjusted hydraulically, independently from each other, by means of the fourth hydraulic cylinders 23 of the second double cylinder arrangements. For adjusting the left mowing unit 5 to a wider working width, the control valves 31, 33 and 34 are actuated such that pressurized hydraulic fluid is forced through the port B1. Thereby, the bottom-side chamber of the fourth hydraulic cylinder 23 is pressurized so that the fourth hydraulic cylinder 23 is extended and the left mowing unit 5 is moved outwards by swinging the swivel arm 9 about its upper hinge axis 10. For adjusting the right mowing unit 5 to a wider working width, the control valves 31, 35 and 36 are controlled so that the fourth hydraulic cylinder 23 for the right mowing unit 5 is actuated accordingly. When the fourth hydraulic cylinders 23 are fully extended, the agricultural mowing machine 1 has its widest working position as shown in FIG. 3f.

For adjusting the working width of the left mowing unit 5 to a smaller value, the control valves 32, 33 and 34 are actuated. In this case, pressurized hydraulic fluid flows through the port A1 for pressurizing the head-side chamber of the fourth hydraulic cylinder 23 associated with the left mowing unit 5. Thereby, said fourth hydraulic cylinder 23 is retracted such that the swivel arm 9 swings inwards and the left mowing unit 5 carried by said swivel arm 9 moves towards the frame 3, transversely to the direction of travel. By controlling the control valves 32, 35 and 36, the same applies to the right mowing unit 5.

Figure 3F:
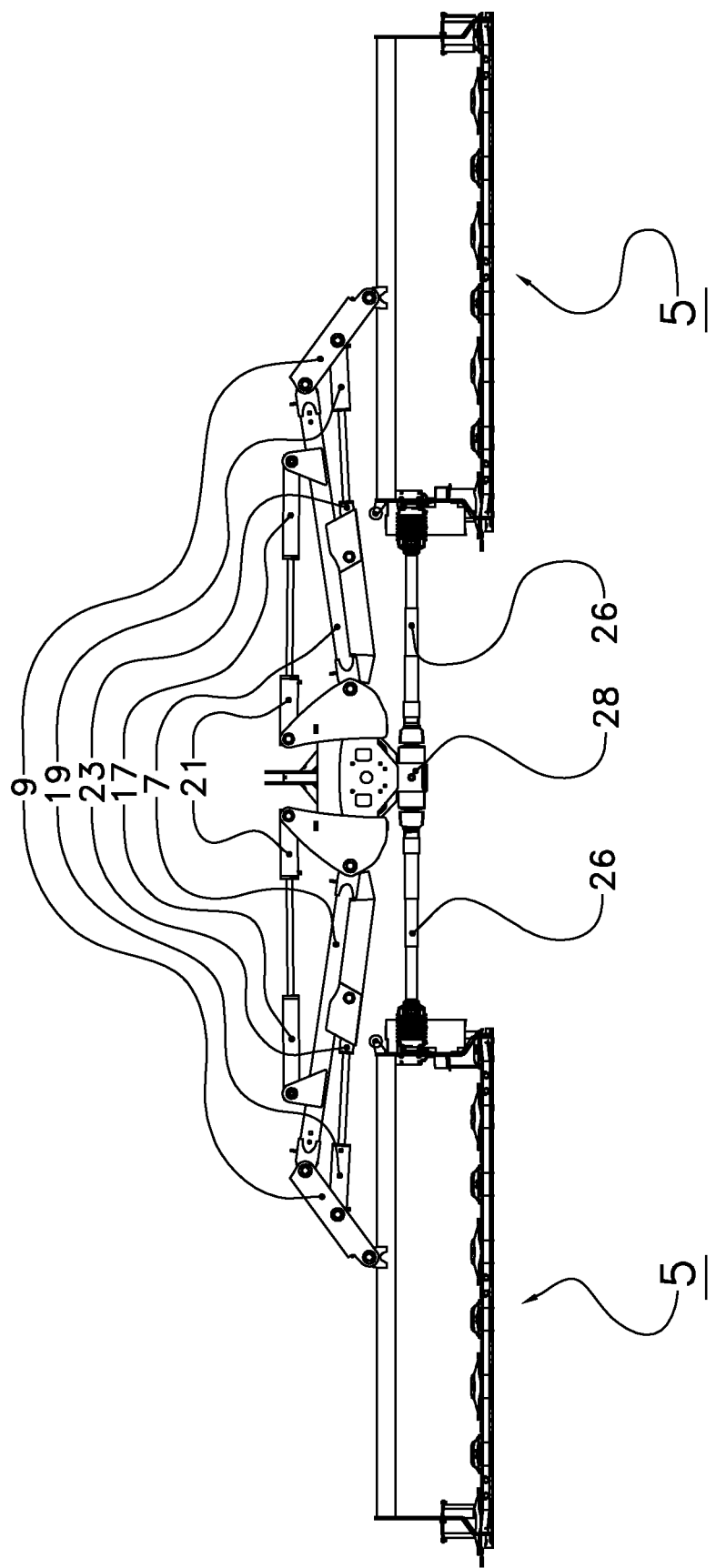

Thus, the left and right mowing units 5 can be displaced transversely to the direction of travel A, between the narrowest working position shown in FIG. 3e and the widest working position illustrated in FIG. 3f. As a result, with a triple mower, the cutting overlap can be adjusted in a simple manner. Such a hydraulic sideshift is advantageous, for example, when working on a slope and also when driving along a curved path or making turns.

In the working position, the ground pressure exerted by the mowing units 5 on the ground is relieved by the third hydraulic cylinders 21, which are connected to a hydraulic accumulator 42. The pressure in the accumulator 42 can be detected by a pressure sensor 43, and it may be adjusted in order to control the ground pressure relief in an accurate manner. In this exemplary embodiment, the third hydraulic cylinders 21 have a double function: they are also used for lifting the mowing units 5 to the headland position. The head-side chambers of the third hydraulic cylinders 21 are connected to respective buffer cylinders 41. The buffer cylinders 41 separate the hydraulic system components for lifting the mowing units 5 to the headland position from the hydraulic system of the tractor. As a result, the hydraulic ground pressure relief system is a closed system. Thereby, the ground pressure relief setting is maintained when the mowing units 5 are lifted to headland.

For lifting the mowing units 5 to their headland positions, the hydraulic system of the agricultural mowing machine 1 comprises a second control valve assembly 30 which is adapted to be hydraulically connected to a single-acting tractor valve 50. The second control valve assembly 30 comprises two control valves 39, 40. If the control valves 39, 40 are not actuated, pressurized hydraulic fluid can flow from the single-acting tractor valve 50 to both buffer cylinders 41, thereby moving the pistons accommodated therein so that the third hydraulic cylinders 21 of the left and right mowing units 5 are retracted, i.e. they are lifted to the headland position. In this exemplary embodiment, the headland position is defined by the third hydraulic cylinders 21 in their fully retracted positions. In order to lift only the mowing unit 5 on the left or right, the control valve 39 or 40, respectively, is actuated.

In this exemplary embodiment, in order to prevent the transmission shafts 26 from damaging when the mowing units are lifted from the working position into the transport position, first the fourth hydraulic cylinders 23 should be fully retracted so that the mowing units 5 are in their narrowest working positions shown in FIG. 3e and the third hydraulic cylinders 21 should be fully retracted as well so that the mowing units 5 are already lifted to their headland positions before pivoting the carrying arms 7 upwards. Therefore, the fourth hydraulic cylinders 23 are provided with first sensors 45a, 45b which are adapted to detect if the respective fourth hydraulic cylinder 23 is fully retracted, whereas second sensors 46a, 46b are associated with the third hydraulic cylinders 21 for detecting if they are fully retracted. In this case, the first and second sensors are provided with proximity sensors 45*a*, 46*a* and detection plates 45*b*, 46*b* mounted on the hydraulic cylinders 21, 23 and the piston rods 53. A control device (not shown) is connected to the first and second sensors 45*a*, 45*b*, 46*a*, 46*b* to receive detection signals therefrom. The control device is programmed in such a manner that the first and second hydraulic cylinders 17, 19 cannot be operated unless it has been detected that the third and fourth hydraulic cylinders 21, 23 have been fully retracted. Thus, the control device and associated first and second sensors 45*a*, 45*b*, 46*a*, 46*b* impose a predetermined sequence for the folding process, thereby safeguarding any damage.

After the third and fourth hydraulic cylinders 21, 23 have been fully retracted, i.e. the mowing units 5 have reached their narrowest working position and have been lifted to the headland position, the mowing units 5 can be moved to the transport position by controlling the control valves 31, 37 and 38. Thus, pressurized hydraulic fluid is forced into the head-side chamber 55 of the second hydraulic cylinders 19 so that they are retracted. As the bottom-side chamber 56 of the second hydraulic cylinders 19 is connected to the head-side chamber 55 of the first hydraulic cylinders 17, said first hydraulic cylinders 17 are actuated at the same time. As a result, the swivel arms 9 are swung towards the frame 3 about their upper hinge axes 10, and the carrying arms 7 are pivoted upwards about their pivot axes 8 until the mowing units are situated in the transport position again.

FIGS. 5*a* to 5*d* show a second embodiment according to the invention. In this case, the headland position of the mowing units 5 is not defined by the third hydraulic cylinders 21 in their fully retracted position. Instead, the headland position is defined by means of a stop 47 which is formed by a bracket. In this case, the third hydraulic cylinder 21 comprises a protruding pin 48 which is received by the bracket 47 when the mowing unit 5 is lifted to the headland position (as can be seen best in FIG. 6). In order to lift the mowing units 5 to the transport position, the bracket 47 may be swung away, for example by pulling a cord from the driver's cab or hydraulically. The construction and operation of the agricultural mowing machine according to this second embodiment is the same as or similar to the first embodiment described above, and is therefore not described in further detail.

The invention is not limited by the exemplary embodiments described above. Variations to the disclosed embodiments can be understood and effected by those skilled in the art and practicing the claimed invention, from a study of the drawings, the disclosure, and the appended claims. The scope of protection is defined by the claims. Any reference signs in the claims should not be construed as limiting the scope.

The invention claimed is:

1. An agricultural mowing machine, in particular for mowing grass, the machine comprising:
   a frame having a coupling device for coupling the machine to a tractor;
   a carrying arm which is pivotally connected to the frame;
   a first hydraulic cylinder configured to pivot the carrying arm relative to the frame;
   a lateral displacement structure connected to the carrying arm, wherein the lateral displacement structure is displaceable relative to the carrying arm in a lateral direction;
   a second hydraulic cylinder configured to move the lateral displacement structure relative to the carrying arm;
   a mowing unit connected to the lateral displacement structure, the mowing unit movable between a horizontal working position, a raised headland position, and a transport position,
   wherein the first hydraulic cylinder and the second hydraulic cylinder are connected to each other in such a manner that when the mowing unit is in the transport position and the first hydraulic cylinder or the second hydraulic cylinder is actuated by pressurized hydraulic fluid, hydraulic fluid discharged from said first or second hydraulic cylinder is supplied under pressure to the other of the first or second hydraulic cylinder for pivoting the carrying arm so as to move the mowing unit from the transport position towards the headland position and displacing the lateral displacement structure outwards relative to the carrying arm simultaneously, wherein a fourth hydraulic cylinder is provided which is configured to adjust the working position of the mowing unit transversely to a direction of travel of the machine between a narrowest working position and a widest working position, wherein the second hydraulic cylinder and the fourth hydraulic cylinder have a common piston rod thereby constituting a double cylinder arrangement.

2. The machine as claimed in claim 1, wherein the carrying arm is pivotally connected to the frame about a horizontal pivot axis.

3. The machine as claimed in claim 2, wherein the carrying arm is pivotable about the horizontal pivot axis in a vertical plane transversely to the direction of travel between a substantially vertical position, wherein the moving unit is in the transport position, an upwardly inclined position, wherein the moving unit is in the headland position, and a substantially horizontal position, wherein the moving unit is in the working position, and wherein the mowing unit comprises a plurality of cutting elements which are driven in rotation, and wherein the machine comprises a driveline arrangement configured to mechanically drive in rotation the cutting elements of the mowing unit, wherein the driveline arrangement comprises a transmission shaft with a variable length ranging from a minimum length up to a maximum length, and wherein the transmission shaft extends between the frame and the mowing unit and at least partially lies in said vertical plane of the carrying arm, and wherein the machine is configured in such a manner that when the carrying arm is pivoted from the substantially vertical position into the upwardly inclined position, the mowing unit is displaced simultaneously relative to the carrying arm so as to prevent the transmission shaft from becoming shorter than the minimum length and/or longer than the maximum length and/or from running against the frame.

4. The machine as claimed in claim 1, wherein the first hydraulic cylinder and the second hydraulic cylinder are connected hydraulically in series.

5. The machine as claimed in claim 1, wherein the machine comprises a control valve assembly settable in an unfolding position for actuating the first hydraulic cylinder or the second hydraulic cylinder by pressurized hydraulic fluid for pivoting the carrying arm so as to move the mowing unit from the transport position towards the headland position and simultaneously displacing the lateral displacement structure outwards relative to the carrying arm.

6. The machine as claimed in claim 5, wherein, with the mowing unit in the headland position, the control valve assembly is settable in a folding position for actuating the second hydraulic cylinder or the first hydraulic cylinder by pressurized hydraulic fluid for displacing the lateral displacement structure inwards relative to the carrying arm and simultaneously pivoting the carrying arm so as to move the mowing unit from the headland position towards the transport position.

7. The machine as claimed in claim 1, wherein the first and second hydraulic cylinders each comprise:
   a cylinder bottom and a cylinder head,
   a piston/piston rod assembly comprising a piston rod which protrudes outwards through an associated bore in the cylinder head and a piston which is attached to the piston rod, wherein the piston delimits in the cylinder between the piston and the cylinder head a variable head-side chamber, and further delimits between the piston and the cylinder bottom a variable bottom-side chamber; and wherein the head-side chamber of the first hydraulic cylinder is hydraulically connected to the bottom-side chamber of the second hydraulic cylinder such that pressurizing the bottom-side chamber of the first hydraulic cylinder or pressurizing the head-side chamber of the second hydraulic cylinder in order to move the respective piston of the first or second hydraulic cylinder, will automatically result in movement of the piston of the other of the first or second hydraulic cylinder.

8. The machine as claimed in claim 1, wherein a third hydraulic cylinder is provided which is configured to lift the mowing unit from the working position towards the headland position, wherein the first hydraulic cylinder and the third hydraulic cylinder have a common piston rod thereby constituting a double cylinder arrangement.

9. The machine as claimed in claim 8, wherein the third hydraulic cylinder is connected to a hydraulic accumulator for providing ground pressure relief for the mowing unit in the working position.

10. The machine as claimed in claim 8, wherein a first sensor is provided which is configured to detect if the fourth hydraulic cylinder is fully retracted so that the mowing unit is in its narrowest working position, and wherein a second sensor is provided which is configured to detect if the third hydraulic cylinder is fully retracted when or after the mowing unit has reached the headland position when lifting from the working position, and wherein a control device is provided which is connected to the first and second sensors for receiving detection signals therefrom, and wherein the control device is configured or programmed to allow the first hydraulic cylinder and/or the second hydraulic cylinder to be actuated by means of pressurized hydraulic fluid so as to move the mowing unit to the transport position only if the first and second sensors have detected that the third and fourth hydraulic cylinders have been fully retracted.

11. The machine as claimed in claim 1, wherein the lateral displacement structure comprises a swivel arm which is pivotally connected between the carrying arm and the mowing unit.

12. The machine as claimed in claim 11, wherein the mowing unit at an upper inner portion thereof comprises an abutting element facing the carrying arm, and wherein the carrying arm at a lower portion thereof comprises a guide track which is configured to guide the abutting element of the mowing unit when the mowing unit is moved from the transport position towards the headland position.

13. The machine as claimed in claim 1, wherein the mowing unit constitutes a side mowing unit which is configured to be mounted to the rear of the tractor for extending to the side of the tractor in the working position, and wherein the machine comprises a frontal mowing unit configured to be mounted in front of the tractor, and wherein the positioning of the mowing units is such that the working area of the side mowing unit overlaps the area already worked by the frontal mowing unit, and wherein said overlap is adjustable during work by actuating the fourth hydraulic cylinder for moving the side mowing unit transversely with respect to the direction of travel.

14. A method for unfolding/folding the machine as claimed in claim 1 from the transport position, comprising actuating the first hydraulic cylinder or the second hydraulic cylinder by pressurized hydraulic fluid for pivoting the carrying arm so as to move the mowing unit between the transport position and the headland position and, in unison therewith, displacing the lateral displacement structure relative to the carrying arm.

* * * * *